United States Patent
Smith

(10) Patent No.: US 9,295,310 B1
(45) Date of Patent: Mar. 29, 2016

(54) IDENTITY SHIELDING DEVICE

(71) Applicant: Daryl A. Smith, Los Angeles, CA (US)

(72) Inventor: Daryl A. Smith, Los Angeles, CA (US)

(73) Assignee: Daryl A. Smith, Los Angeles, CA (US)

( * ) Notice: Subject to any disclaimer, the term of this patent is extended or adjusted under 35 U.S.C. 154(b) by 0 days.

(21) Appl. No.: 14/207,967

(22) Filed: Mar. 13, 2014

Related U.S. Application Data

(60) Provisional application No. 61/784,244, filed on Mar. 14, 2013.

(51) Int. Cl.
*A45B 23/00* (2006.01)
*A45B 25/20* (2006.01)
*G09F 21/02* (2006.01)

(52) U.S. Cl.
CPC ............... *A45B 23/00* (2013.01); *A45B 25/20* (2013.01); *A45B 2023/0093* (2013.01); *G09F 21/02* (2013.01)

(58) Field of Classification Search
CPC ............... A45B 23/00; A45B 25/20; A45B 2023/0093; G09F 21/02
USPC ........ 135/20.1, 25.2, 33.7, 33.71; 4/607, 608, 4/610
See application file for complete search history.

(56) References Cited

U.S. PATENT DOCUMENTS

| | | | | |
|---|---|---|---|---|
| 23,503 | A * | 4/1859 | Selden | 135/25.2 |
| 315,994 | A * | 4/1885 | Ball | 40/586 |
| 403,698 | A * | 5/1889 | Rector | 40/586 |
| 603,299 | A * | 5/1898 | Vanderman | 4/610 |
| 1,128,662 | A * | 2/1915 | Colter | 4/610 |
| 1,581,843 | A | 4/1926 | Little, Jr. | |
| 1,714,218 | A * | 5/1929 | Frost | 4/610 |
| 2,279,150 | A * | 4/1942 | Thom | 239/208 |
| 2,841,160 | A | 7/1958 | Dewispelere | |
| 3,452,765 | A * | 7/1969 | Slaton | 135/19.5 |
| 4,193,415 | A * | 3/1980 | Hermanson | 135/25.2 |
| 4,601,301 | A * | 7/1986 | Hermanson | 135/25.2 |
| 4,607,653 | A * | 8/1986 | Hermanson | 135/20.3 |
| 5,355,902 | A * | 10/1994 | Schlangen | 135/20.1 |
| 5,368,055 | A | 11/1994 | Johnson et al. | |
| 5,487,401 | A | 1/1996 | Johnson et al. | |
| 6,694,538 | B1 * | 2/2004 | Jones | 4/476 |
| 2007/0283991 | A1 * | 12/2007 | Sherts | 135/90 |
| 2008/0283735 | A1 | 11/2008 | Verenkoff | |
| 2010/0307548 | A1 * | 12/2010 | Cain et al. | 135/20.1 |
| 2010/0323608 | A1 | 12/2010 | Sanhedrai et al. | |

(Continued)

OTHER PUBLICATIONS

Umbrella : Funny, Bizarre, Amazing Pictures & Videos. N.p., n.d. Web. Aug. 8, 2014. <http://www.foundshit.com/tag/umbrella>; posted Feb. 4, 2011.

(Continued)

*Primary Examiner* — Noah Chandler Hawk
(74) *Attorney, Agent, or Firm* — Vorys, Sater, Seymour and Pease LLP

(57) ABSTRACT

Disclosed is an identity shielding device to be used when notable persons do not wish to have their photograph taken. In one embodiment, an identity shielding device has a shaft with first and second ends; a sliding splint slideably attached to the shaft; and a foldable framework attached to the sliding splint and the first end of the shaft, the framework being open at both ends, and having a collapsible shield affixed to the framework. The foldable framework includes both ribs and fasteners.

18 Claims, 12 Drawing Sheets

(56) References Cited

U.S. PATENT DOCUMENTS

2012/0056546 A1 3/2012 Harvey
2013/0284220 A1* 10/2013 Liu et al. ............... 135/20.1

OTHER PUBLICATIONS

Amazon.com: Big Mouth Toys Paparazzi Shades: Toys & Games. N.p., n.d. Web. Jun. 11, 2013. <http://www.amazon.com/dp/B004NM6N98/?tag=051-20>.

* cited by examiner

IDENTITY SHIELDING DEVICE

CROSS-REFERENCE TO RELATED APPLICATIONS

This application claims priority to and the benefit of U.S. Provisional Application No. 61/784,244, filed Mar. 14, 2013, the disclosures of which are incorporated herein in their entirety by reference.

BACKGROUND

Notable subjects, such as celebrities, politicians, accident victims, victims of crimes, criminal suspects, and the like, may find his or her picture is frequently taken without consent. Unfortunately, these notable subjects may have little recourse available after the picture is taken. Further, while the notable subject may be able to stop one photographer from taking his picture, he may be unable to stop many photographers from taking his photograph. And, he may be unable to stop one or many photographers from taking his picture at long range while using devices such as telephoto lenses, or while shooting from an elevated vantage point. Therefore, a device which inhibits one or many photographers' ability to take a picture of the notable subject is desirable.

Some devices, for example, the inventions of U.S. application Ser. Nos. 12/807,530, 12/308,525, and 11/798,446 interfere with a photographer's camera and subsequent ability to take a photograph. However, it is not always desirable to use the systems typified by these inventions because they may interfere with the user's own electronic devices or his ability to move freely without distraction. Thus, a device with inhibits a photographer's ability to take an unwanted picture of a notable subject while allowing the user to continue to use his electronic devices and move freely without distraction is desirable.

SUMMARY

In one embodiment, an identity shielding device is described, the device comprising a shaft having first and second ends, a framework not parallel to the shaft and attached nearer to one end of the shaft, the framework defining an interior space and comprising an open top and an open bottom, and a shield capable of being affixed to the framework.

In a second embodiment, an identity shielding device is described, the device comprising a shaft having first and second ends wherein a cap is affixed to the first end and a handle affixed to the second end, a sliding splint slideably attached to the shaft, a framework not parallel to the shaft attached to the sliding splint and the cap, the framework defining an interior space and comprising an open top and an open bottom, and a shield capable of being affixed to the framework.

In a third embodiment, an identity shielding device is described, the device comprising a shaft having first and second ends wherein a cap is affixed to the first end and a handle is affixed to the second end, a sliding splint slideably attached to the shaft, and a plurality of ribs, the ribs attached to each other by a plurality of fasteners, the plurality of ribs and fasteners thereby forming a framework, the framework being not parallel to the shaft and being attached to the sliding splint and the cap, the framework defining an interior space and comprising an open top and an open bottom, and having a shield capable of being affixed to the framework.

In a fourth embodiment, an identity shielding device is described, the device comprising a shaft having an upper region and a lower region, a framework having a retracted position and an extended position, said framework creating a substantially closed periphery defining an interior space comprising an open top and an open bottom when in its extended position, a means for attaching said framework to said shaft in a non-parallel arrangement, a means for moving said framework between its retracted and extended position, and a shield capable of covering said framework in its extended position.

DETAILED DESCRIPTION

FIGS. 1-7 generally show a model of the identity shielding device 10. The model is used for illustration purposes and may not be to scale. FIGS. 8-12 generally show an alternate embodiment of the identity shielding device 10.

Figure 1:
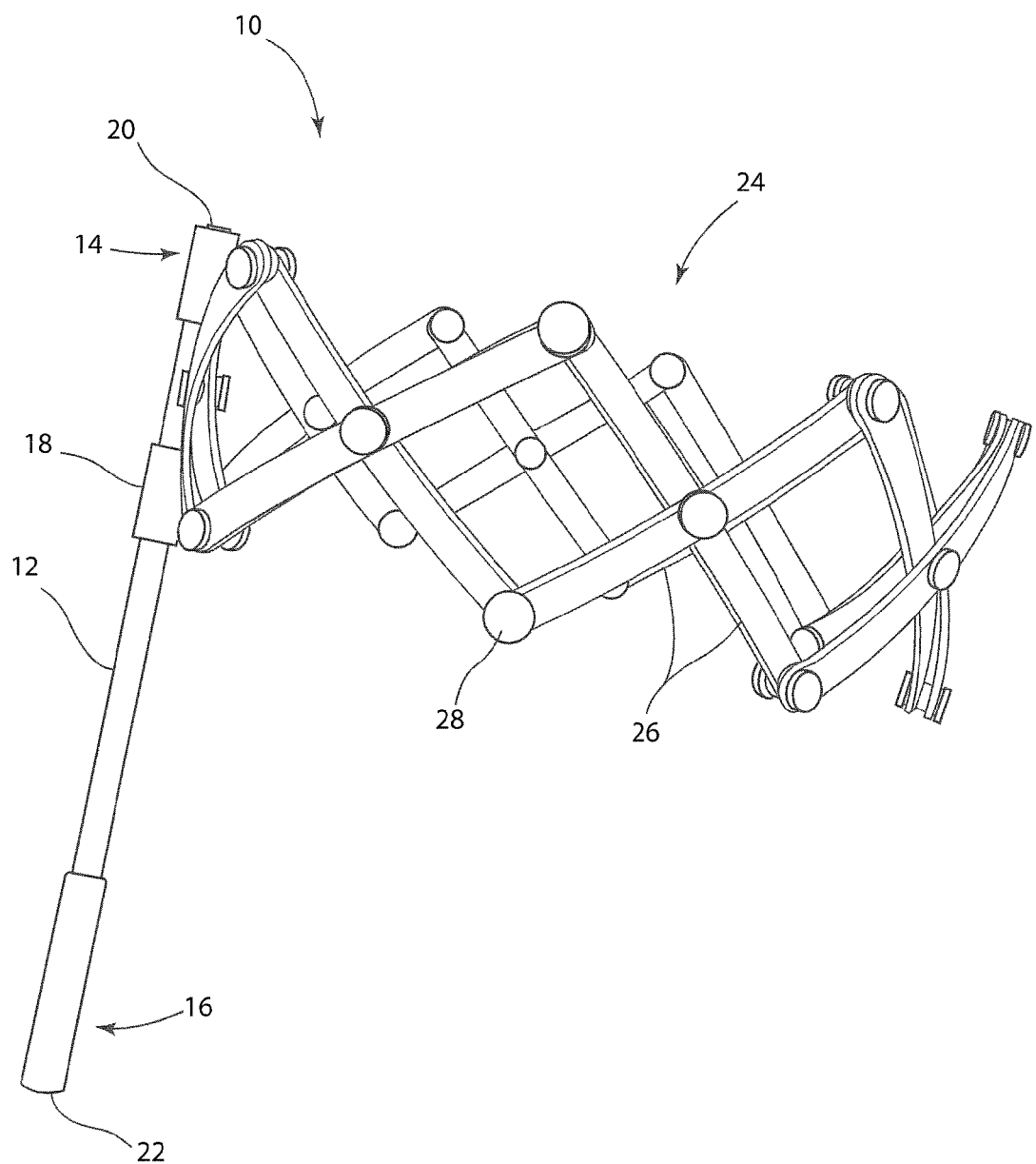
FIG. 1 is a side view of the identity shielding device with the framework.

FIG. 1 shows a side view of the identity shielding device 10. The identity shielding device 10 has a shaft 12 with a first end 14 and a second end 16. A sliding splint 18 is slideably attached to the shaft 12. The sliding splint 18 is generally attached to allow free motion of the sliding splint 18 along a length of the shaft 12. In some embodiments, a depressible flange (not shown) may be located midway about the shaft 12 to aid the user in temporarily positioning the sliding splint 18 on the shaft 12. In other embodiments, the flange may have releasable compression means to aid the user in temporarily positioning the sliding splint 18 on the shaft 12.

With continued reference to FIG. 1, in some embodiments first end 14 has a cap 20 affixed to the shaft 12. In some embodiments, second end 16 has a handle 22 affixed to the shaft 12. Some embodiments of the current invention may feature either the cap 20 or the handle 22, some embodiments of the current may feature both the cap 20 and the handle 22, and yet other embodiments may feature neither the cap 20, nor the handle 22.

FIG. 1 shows a framework 24 of the identity shielding device 10. In this exemplary embodiment, the framework 24 is foldable and shown in an open, or extended position. Foldable framework 24 is attached to the first end 14 of the shaft 12 or may alternatively be attached to the cap 20 or to the sliding splint 18 of the identity shielding device 10. Further, a first end of the foldable framework 24 may be attached in a first position to the sliding splint 18 and in a fixed second position to the shaft 12.

Figure 4:
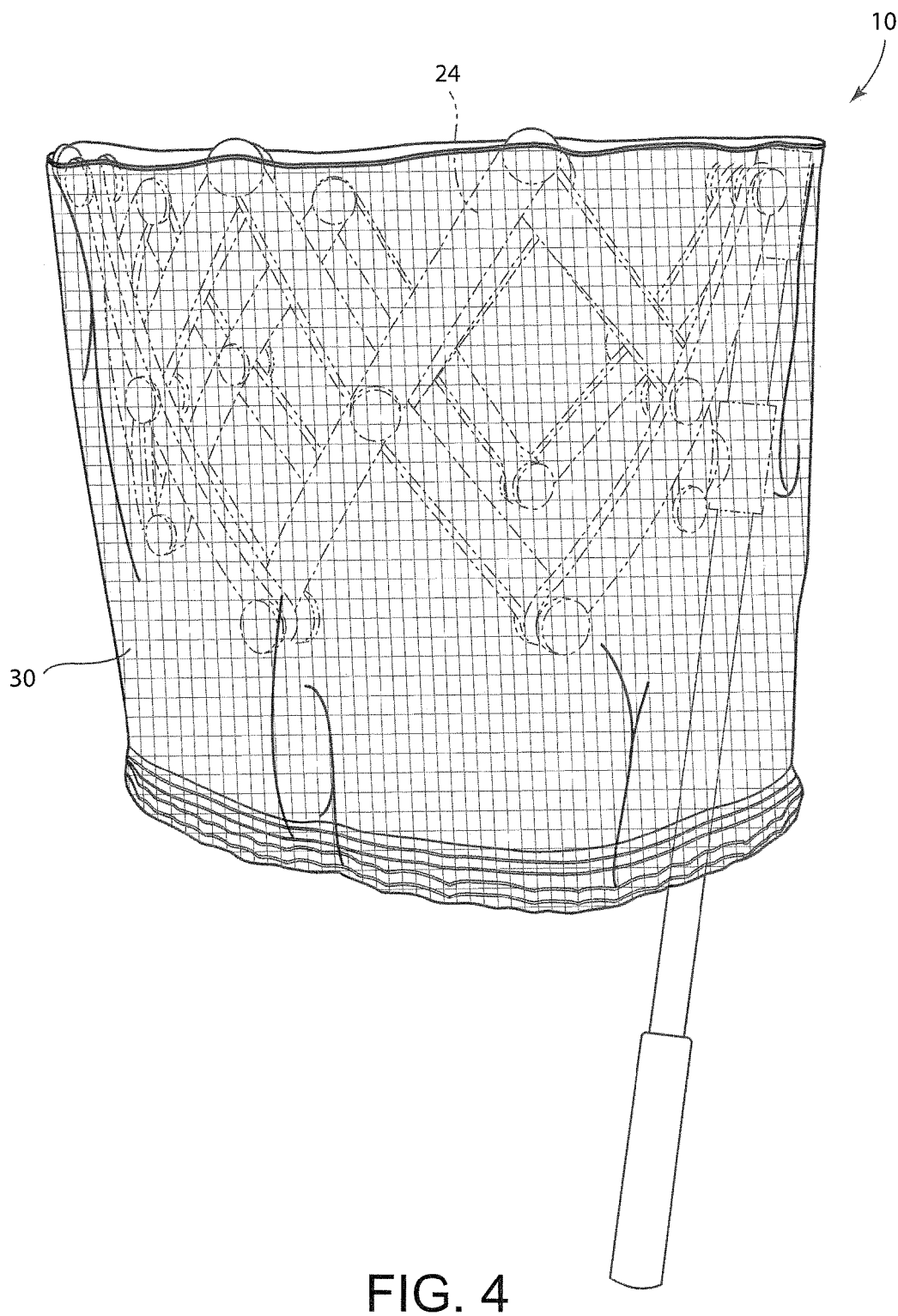
FIG. 4 is a side view of the identity shielding device with the shield affixed to the identity shielding device.
Figure 5:
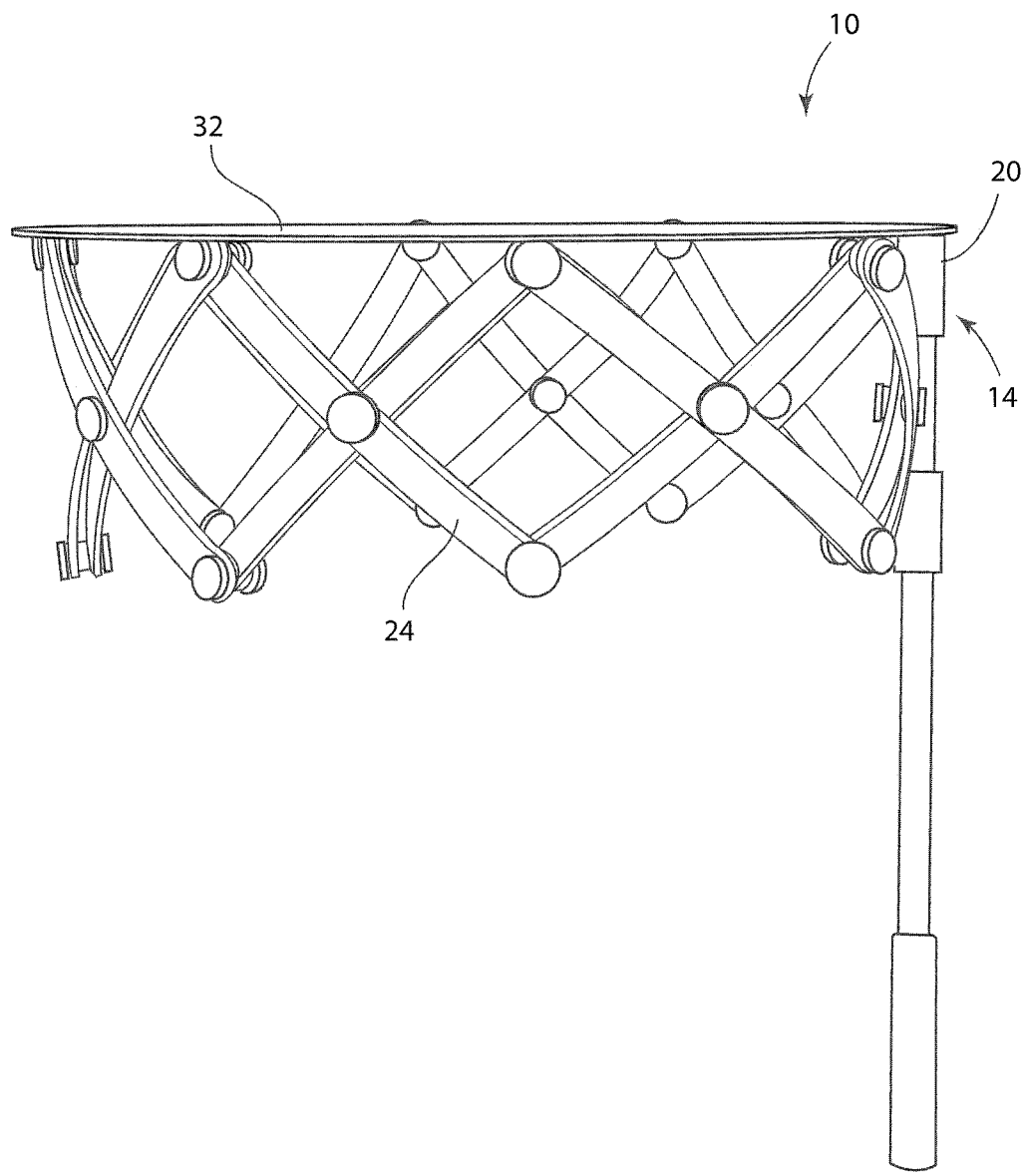
FIG. 5 is a side view of the identity shielding device with the canopy affixed to the end of the framework adjacent the first end of the identity shielding device.
Figure 6:
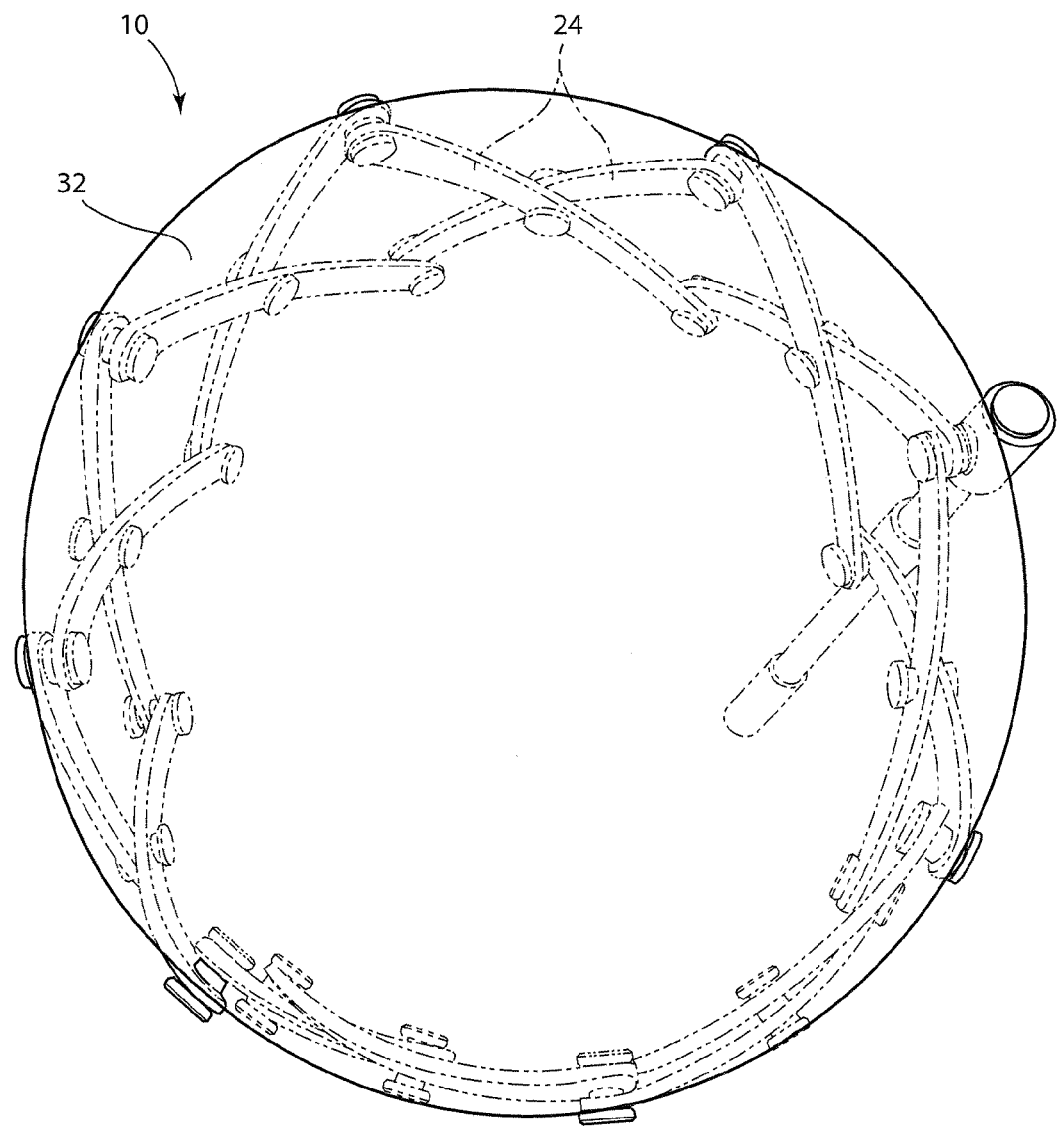
FIG. 6 is a top view of the identity shielding device with the canopy affixed to the end of the framework adjacent the first end of the identity shielding device.

As shown in FIG. 4, foldable framework 24 has a shield 30 attached to the framework 24. In exemplary embodiments, the shield 30 may either be rigid or collapsible. As shown in FIGS. 5-6, in alternate embodiments a canopy 32 may be affixed to the end of the foldable framework 24 adjacent the first end 14 or cap 20. Collapsible shield 30 and canopy 32 may be used together or separately, as the user desires.

Figure 2:
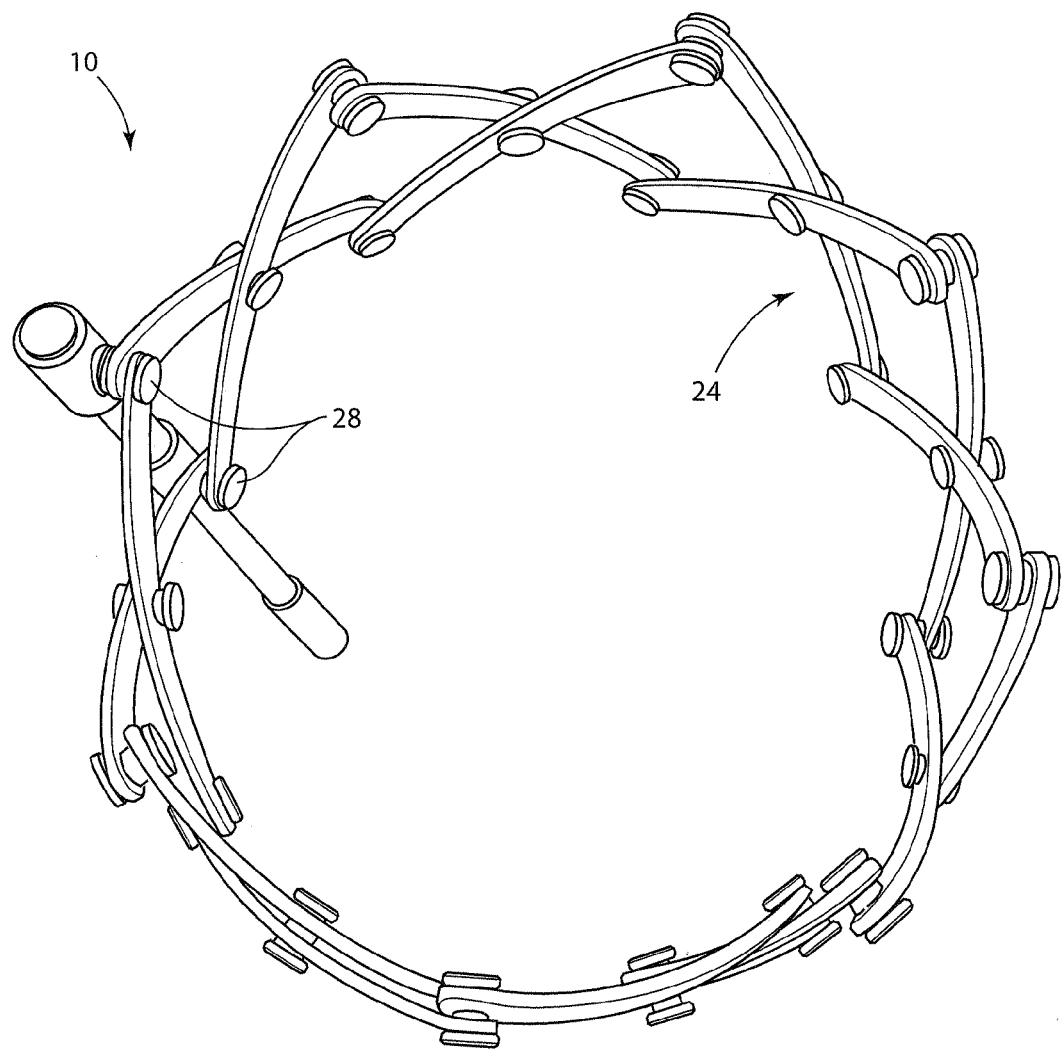
FIG. 2 is a top view of the identity shielding device with the framework.

Turning now to FIG. 2, foldable framework 24 is generally arranged in an annular configuration. As shown in FIG. 2, foldable framework 24 defines a collapsible tube open at the first and second ends. While foldable framework 24 is generally arranged in an annular configuration, it is envisioned that foldable framework 24 may be arranged in any number of other configurations, for example, in configurations similar to a box, triangle, half round, or even irregular polygon shapes.

Figure 3:
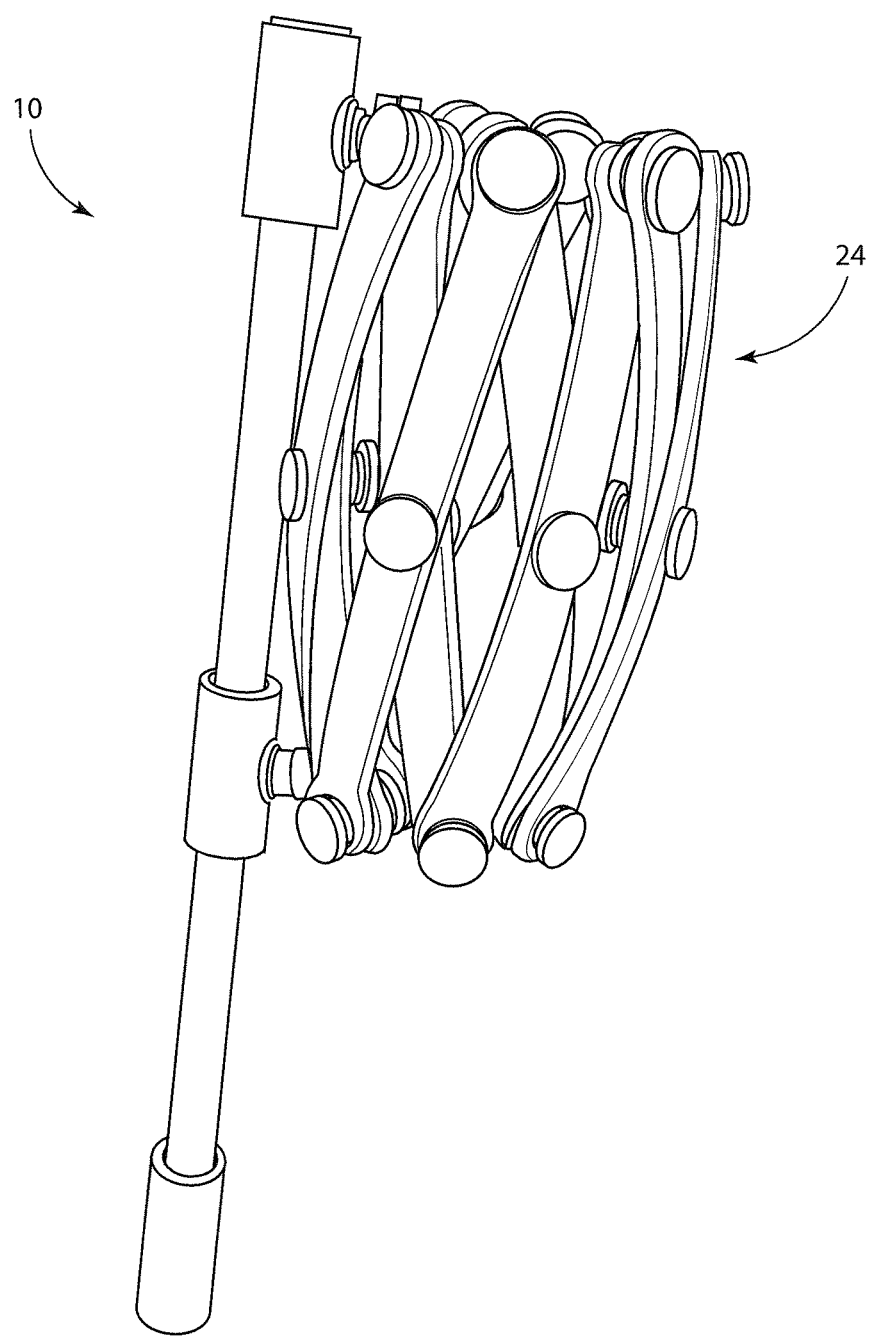
FIG. 3 is a side view of the identity shielding device with the foldable framework collapsed.
Figure 7:
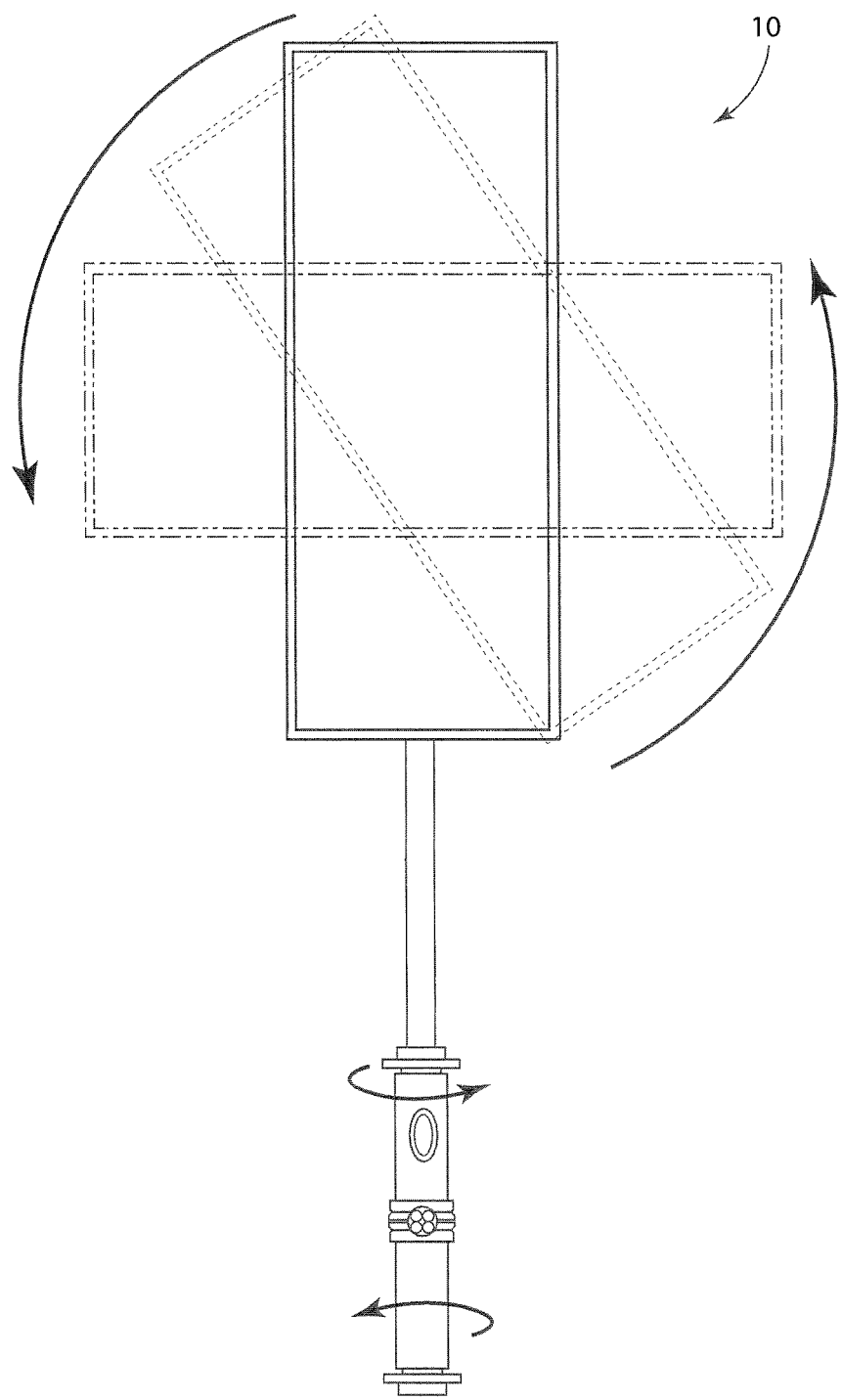
FIG. 7 is a side view of an alternate embodiment of the identity shielding device with the foldable framework collapsed.
Figure 8:
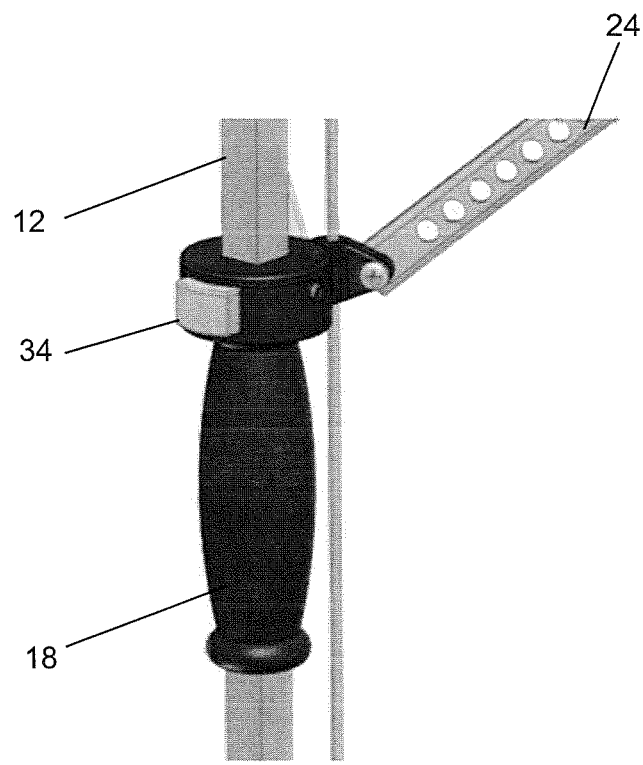
FIG. 8 is a view of an alternate embodiment of an upper handle of the identity shielding device.
Figure 9:
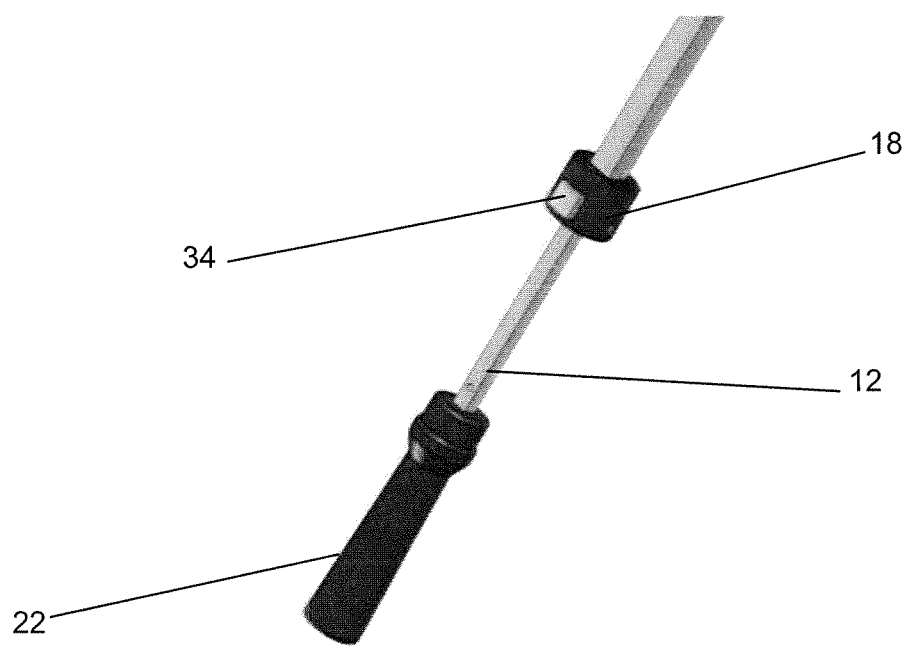
FIG. 9 is a view of an alternate embodiment of an extended position of a lower handle of the identity shielding device.
Figure 10:
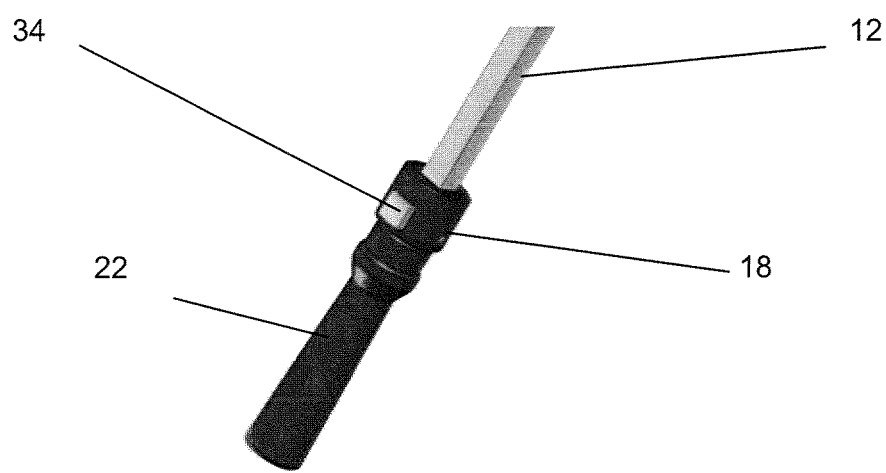
FIG. 10 is a view of an alternate embodiment of a collapsed position of a lower handle of the identity shielding device.
Figure 11:
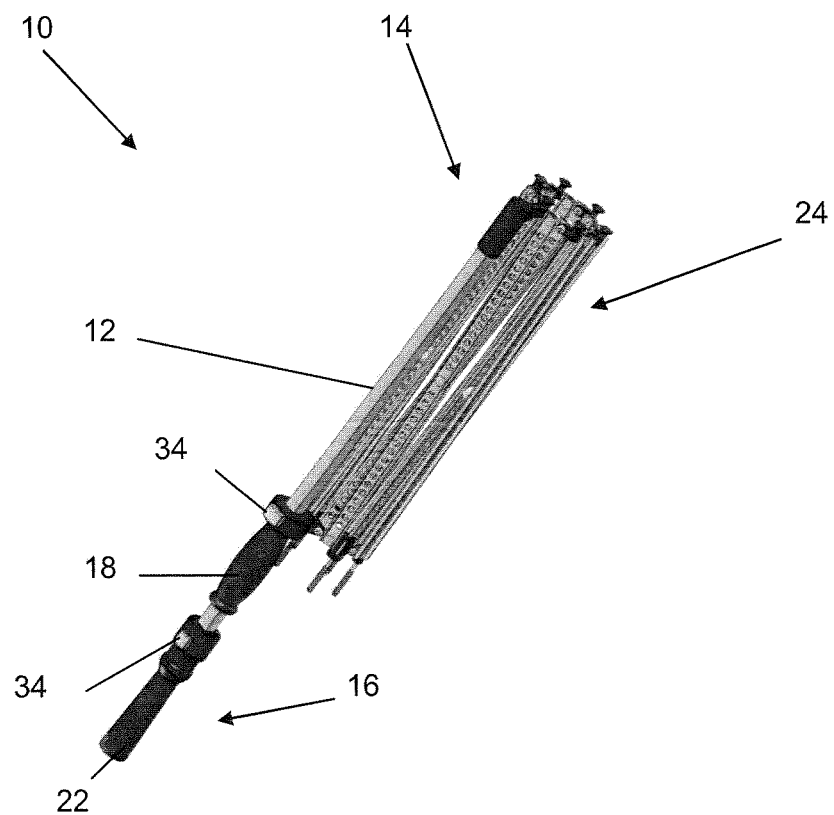
FIG. 11 is a closed isometric view of an alternate embodiment of the identity shielding device.
Figure 12:
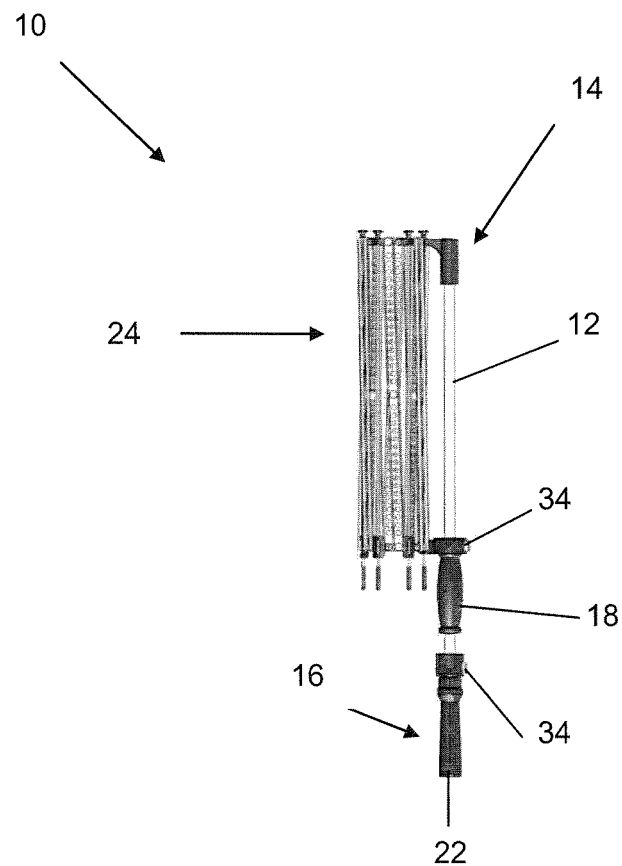
FIG. 12 is a closed side view of an alternate embodiment of the identity shielding device.

As shown in FIG. 3, the foldable framework 24 is designed to close, collapse, or retract upon itself. It is envisioned that when foldable framework 24 is collapsed, or retracted, the user of the identity shielding device 10 may more easily transport the device 10. As shown in FIG. 7, in alternate embodiments foldable framework 24 may be angular instead of annular. In these instances, foldable framework 24 may collapse upon itself, and rotate to align with shaft 12 and sliding splint 18 for easy storage.

Returning now to FIG. 1, the foldable framework 24 is comprised of a plurality of ribs 26. Each rib 26 terminates in a grommet or eyelet (not shown). To create the foldable framework 24 the ribs 26 are positioned with the grommet of one rib 26 on top of the grommet of another rib 26. A fastener 28 is then threaded through the two grommets to fix the ribs 26 together. A fastener 28 is also used to affix the ribs 26 to the sliding splint 18 and the first end 14. As shown, the ribs 26 are generally arranged in an overlapping fashion. Additional fasteners 28 may be used to affix the two ribs 26 to each other where they overlap for stability. As previously disclosed, in this embodiment, the ribs 26 are arranged annularly.

Fasteners 28 are used to rotatably affix the ribs 26 together. In one embodiment, the fastener 28 used may be a pin. In an alternate embodiment, the fastener 28 used may be a press stud. In still other embodiments, the fastener 28 used may be a nut and bolt. Still other fasteners 28 known to practitioners in the art may be used without departing from the spirit of the invention.

Regardless of the type of fastener 28 used to affix ribs 26 to each other, to the first end 14 of the shaft 12 and to the sliding splint 18, the ribs 26 are affixed for pivotal movement. The movement of the foldable framework 24 is proportional to the movement of the sliding splint 18. When a user of the identity shielding device 10 moves the sliding splint 18 towards the first end 14 of the shaft 12, there is a corresponding opening, or expanding movement in the identity shielding device 10. Conversely, when the user of the identity shielding device 10 moves the sliding splint 18 towards the second end 16 of the shaft 12, there is a corresponding closing, or collapsing movement in the identity shielding device 10. As previously disclosed, the sliding splint 18 may include means for temporarily affixing the sliding splint 18 to the desired location on the shaft 12, allowing the framework 24 to remain in an extended or a retracted position, as desired by the user.

It is envisioned that shaft 12 and sliding splint 18 are located at the periphery of the foldable framework 24, as shown in FIGS. 1-2. In this embodiment, the foldable framework 24 will surround the user, and he will hold the shaft 12 or handle 22 located on the periphery of the foldable framework 24. However, in alternate embodiments, shaft 12 and sliding splint 18 may be arranged in the center of foldable framework 24. In this embodiment, the foldable framework 24 will still surround the user.

Returning to FIG. 4, a collapsible shield 30 is affixed to the foldable framework 24. In one embodiment the size of the collapsible shield 30 is matched to the dimensions of the foldable framework 24 when it is in the extended, or expanded position. Also, the collapsible shield 30 collapses with the foldable framework 24 as the user maneuvers the sliding splint 18 towards the second end 16 of the shaft 12.

Collapsible shield 30 is may be affixed to the foldable framework 24 by any means known in the art, for example, by adhesives or mechanical means. In some embodiments, collapsible shield 30 may be comprised of a stiff material or a material with stays. In these embodiments, while collapsible shield 30 is affixed to the foldable framework 24, the collapsible shield 30 may extend beyond the framework 24. As previously disclosed, in other embodiments, collapsible shield 30 extends generally to the end of the framework 24.

The collapsible shield 30 is comprised of a semi-opaque material. In a first embodiment, the semi-opaque material may be a variety of thin plastic. In some embodiments, the plastic may be tinted. In still other embodiments, the plastic may be frosted. In yet other embodiments, the plastic may have a pattern contained in or applied to the plastic comprising the collapsible shield 30. In another embodiment, the semi-opaque material may be a fabric material. In some embodiments the fabric may be a chiffon or nylon material. In yet other embodiments the fabric may be a loosely woven material. In yet other embodiments the fabric may be a chiffon, nylon, or loosely woven material with a pattern contained in or applied to the material. In some embodiments the semi-opaque material may be partly comprised of elastic so that the collapsible shield 30 more easily expands and contracts with the foldable framework 24. Finally, in yet other embodiments, the collapsible shield 30 may be comprised of an opaque material, and have a small viewing window inserted in the material so the user may readily see outside of the identity shielding device 10.

The identity shielding device 10 is designed to be easily operated by a user. Therefore, the identity shielding device 10 is comprised of strong, light weight materials. In some embodiments, the shaft 12, sliding splint 18, cap 20, handle 22, ribs 26 and fasteners 28 may be comprised of a light weight metal such as aluminum. In other embodiments the shaft 12, sliding splint 18, cap 20, handle 22, ribs 26 and fasteners 28 may be comprised of a plastic material. In yet other embodiments the shaft 12, sliding splint 18, cap 20, handle 22, ribs 26 and fasteners 28 may be comprised of a variety of metal, composite, carbon fiber, aluminum and plastics. Other materials known to practitioners in the art may be used without departing from the spirit of the invention.

The identity shielding device 10 may be manufactured in a variety of sizes, and both the circumference of the device 10 and the width of the frame may be manufactured in a size sufficient the mask the features of the notable subject which he desires to be hidden from view. In some embodiments the collapsible shield 30 may be sized to cover the head of the notable subject, while in other embodiments the collapsible shield 30 may cover the torso, or even the majority of the body of the notable subject. It is contemplated that the device 10 will be sized to cover an individual user, but in other embodiments the diameter of the identity shielding device 10 may be sufficiently large to cover two or more users.

In use, the user of the identity shielding device 10 will carry and store the device 10 in the retracted, or collapsed position. When the user determines that coverage from photographers is necessary he will extend, or expand, the identity shielding device 10. In a personal sized embodiment, the user will extend and carry the identity shielding device 10 himself so that the identity shielding device 10 may be handheld using the handle 22 while it is carried and being used. In a larger embodiment, a handler will extend and carry the handheld identity shielding device 10 while the notable subject remains within the protective ring of the collapsible shield 30. In still larger embodiments, a handler will extend and carry the identity shielding device 10 while two or more notable subjects remain within the protective ring of the collapsible shield 30. If the user determines that additional coverage is needed, he may affix an optional canopy 32 to the open end of collapsible shield adjacent the first end 14 (shown in FIGS. 5-6).

FIGS. 8-12 depict a further alternate embodiment of the present invention. Here, the sliding splint 18 is shown to include a button 34 that aids a user in positioning the sliding splint 18 on a desired location of the shaft 12 with the assistance of a depressible flange (not shown). Further, the handle 22 may also include a button 34 for the same purposes. Further, the device 10 is shown in a closed isometric view as well as a closed side view.

The foregoing provides a description of an identity shielding device 10, a description of how the identity shielding device 10 is arranged, and how the identity shielding device 10 is used. However, this description illustrates only the principles of the invention. Since modification and change will readily occur, it is not desired to limit the invention to the exact construction and operation shown and described herein. Accordingly, all suitable modifications and equivalents are within the scope of this invention.

Although the present invention has been described above in detail, the same is by way of illustration and example only and is not to be taken as a limitation on the present invention.

What is claimed:

1. An identity shielding device comprising:
   a shaft having a first end and a second end;
   a peripheral framework attached nearer to one end of the shaft, the framework defining an interior space and comprising an open top and an open bottom and a shield capable of being affixed to the framework, extending downward therefrom in a manner so as to maintain the open top and open bottom of said identity shielding device, wherein the interior space is free of any portion of said framework protruding into the interior space, and wherein the identity shielding device is handheld and is adapted to be carried while in use;
   a sliding splint slideably attached to the shaft;
   the framework being a foldable framework attached in a first position to the sliding splint and in a fixed second position to the shaft; and
   the shield affixed to the framework.

2. The identity shielding device of claim 1, the device further comprising: a handle attached to the second end of the shaft.

3. The identity shielding device of claim 1, wherein the framework is annularly arranged.

4. The identity shielding device of claim 1, wherein the shield comprises a semi-opaque material.

5. The identity shielding device of claim 1 wherein said shield is a cylindrical shield.

6. The identity shielding, device of claim 1 wherein a top edge of the framework defines a perimeter, and wherein a length between the open top and open bottom of said shield is at least 25 percent of a maximum distance between two furthest apart points on the perimeter.

7. The identity shielding device of claim 1, wherein the framework defines a collapsible tube open at first and second ends.

8. The identity shielding device of claim 1, wherein the framework has a retractable closed position and an extended open position.

9. An identity shielding device comprising:
   a shaft having a first end and a second end;
   a peripheral framework attached nearer to one end of the shaft, the framework defining an interior space and comprising an open top and an open bottom and a shield capable of being affixed to the framework, extending downward therefrom in a manner so as to maintain the open top and open bottom of said identity shielding device, wherein the interior space is free of any portion of said framework protruding into the interior space, and wherein the identity shielding device is handheld and is adapted to be carried while in use;
   a plurality of rigid elongated ribs with first ends and second ends, wherein the plurality of ribs comprises:
   a first rigid rib;
   a second rigid rib;
   a third rigid rib; and
   a fourth rigid rib, wherein the second end of the first rigid rib is pivotally connected to the first end of the third rigid rib and the second end of the second rigid rib is pivotally connected to the first end of the fourth rigid rib; wherein a center location of the first rigid rib is pivotally connected to a center location of the second rigid rib; and wherein a center location of the third rigid rib is pivotally connected to a center location of the fourth rigid rib.

10. The identity shielding device of claim 9, wherein when the framework is in the unfolded position, the first rigid rib forms at least a 30 degree angle with the second rigid rib with the angle originating at the center location of the first rib, and wherein when the framework is in the unfolded position, the first end of the first rigid rib is above the second end of the first rigid rib.

11. The identity shielding device of claim 10, wherein the shield comprises a semi-opaque material.

12. A handheld identity shielding device comprising:
   a shaft having a first end and a second end wherein a handle is affixed to the second end;
   a sliding splint slideably attached to the shaft;
   a plurality of ribs, the ribs attached to each other by a plurality of fasteners, the plurality of ribs and fasteners thereby forming a foldable framework, the foldable framework being not parallel to the shaft and being attached to the sliding splint and attached in a fixed position to the shaft, the foldable framework defining an interior space at least when in an extended position, and comprising an open top and an open bottom, and having a shield capable of being affixed to the foldable framework so that said handheld identity shielding device has an open top and open bottom lacking portions of said framework extending into an interior space defined by said handheld identity shielding device, and wherein said handheld identity shielding device lacks portions of said framework extending into either the open top or the open bottom; and wherein the foldable framework is annularly arranged.

13. The identity shielding device of claim 12, wherein the shield comprises a semi-opaque material.

14. The identity shielding device of claim 12 wherein said shield is cylindrical in shape.

15. A handheld identity shielding device comprising:
a shaft having an upper region and a lower region;
a peripheral foldable framework having a retracted position and an extended position, said peripheral foldable framework creating a substantially closed periphery defining an interior space having an open top and bottom at least when in the extended position;
a means for attaching said peripheral foldable framework to said shaft;
a means for moving said peripheral foldable framework between its retracted and extended position; and
a shield capable of covering said peripheral foldable framework in at least the extended position so that said handheld identity shielding device has an open top and open bottom, wherein the interior space defined by said peripheral foldable framework is lacking protrusions extending from said peripheral foldable framework into the interior space, wherein said handheld identity shielding device is adapted to be carried by a person while in use.

16. The identity shielding device of claim 15, wherein the shaft is positioned on the substantially closed periphery created by said framework.

17. The identity shielding device of claim 15, wherein the shaft is positioned outside the interior space defined by said framework.

18. The identity shielding device of claim 15, wherein said shield is a cylindrical shield.

* * * * *